(12) United States Patent
Knuckles

(10) Patent No.: US 10,245,542 B2
(45) Date of Patent: Apr. 2, 2019

(54) FOLDABLE FILTER FRAME

(71) Applicant: Joseph Dean Knuckles, Loveland, OH (US)

(72) Inventor: Joseph Dean Knuckles, Loveland, OH (US)

(*) Notice: Subject to any disclaimer, the term of this patent is extended or adjusted under 35 U.S.C. 154(b) by 109 days.

(21) Appl. No.: 15/366,233

(22) Filed: Dec. 1, 2016

(65) Prior Publication Data

US 2017/0151522 A1    Jun. 1, 2017

Related U.S. Application Data

(60) Provisional application No. 62/314,637, filed on Mar. 29, 2016, provisional application No. 62/261,679, filed on Dec. 1, 2015.

(51) Int. Cl.
*B01D 46/00* (2006.01)
*B01D 46/52* (2006.01)
*B01D 46/10* (2006.01)

(52) U.S. Cl.
CPC ......... *B01D 46/0016* (2013.01); *B01D 46/10* (2013.01); *B01D 46/521* (2013.01); *B01D 2275/20* (2013.01)

(58) Field of Classification Search
CPC .. B01D 46/0013; B01D 46/002; B01D 46/10; B01D 46/12; B01D 2265/02; B01D 2265/024; Y10S 55/05; Y10S 55/31
USPC .... 55/483, 484, 497, 499, 501, 502, DIG. 5, 55/DIG. 31; 95/273, 286
See application file for complete search history.

(56) References Cited

U.S. PATENT DOCUMENTS

| | | | |
|---|---|---|---|
| 796,310 A | 8/1905 | Fisher | |
| 1,904,318 A | 4/1933 | Lehere | |
| 2,138,874 A * | 12/1938 | Myers | B01D 46/0016 126/299 F |
| 2,297,629 A | 9/1942 | Meyer et al. | |
| 2,352,436 A | 6/1944 | Horr | |
| 2,367,071 A | 1/1945 | Tarlitz | |
| 2,590,744 A | 3/1952 | Woodbury | |
| 4,403,712 A | 9/1983 | Wiesinger | |
| 4,420,315 A | 12/1983 | Kershaw | |
| 4,570,844 A | 2/1986 | Wysocki | |
| 4,913,091 A | 4/1990 | O'Connor | |
| 4,937,958 A | 7/1990 | Stein et al. | |
| 5,577,609 A | 11/1996 | Hexter, Jr. | |

(Continued)

*Primary Examiner* — Duane Smith
*Assistant Examiner* — Minh Chau T Pham
(74) *Attorney, Agent, or Firm* — Daniel F. Nesbitt; Hasse & Nesbitt LLC

(57) ABSTRACT

A foldable filter frame including a filter media and a rectangular support frame surrounding and secured to the filter media, having opposed side frame elements having a hingable joint formed near the midpoint that allows the support frame and a dirt-capturing surface of the filter media to fold along lateral line from a planar, extended position to a folded position. The joint includes a fold line in a dirtied-side attaching panel, and a cut formed through a base and a clean-side attaching panel, of the side frame elements, and a means for biasing the joint to the planar, extended position. The biasing means is a strip of elastic member, stapled to an inside surface of the clean-side attaching panel in a relaxed state, across the cut formed through the clean-side attaching panel. The frame can have Velcro-type fasteners in the corners to secure the frame in the folded position.

21 Claims, 21 Drawing Sheets

(56) References Cited

U.S. PATENT DOCUMENTS

| | | | | |
|---|---|---|---|---|
| 5,931,988 | A * | 8/1999 | LeBlanc | B01D 46/001 55/341.1 |
| 6,033,454 | A | 3/2000 | Hoeffken | |
| 8,021,454 | B2 | 9/2011 | Braunecker et al. | |
| 8,834,611 | B1 * | 9/2014 | Dimicelli | B01D 46/002 55/483 |
| 2003/0172633 | A1 * | 9/2003 | Duffy | B01D 29/012 55/495 |
| 2004/0148915 | A1 | 8/2004 | Lipner | |
| 2005/0138905 | A1 | 6/2005 | Kubokawa | |
| 2007/0199176 | A1 | 8/2007 | McClellan | |
| 2007/0204576 | A1 * | 9/2007 | Terlson | B01D 46/10 55/496 |
| 2008/0034718 | A1 | 2/2008 | Schuld et al. | |
| 2008/0148698 | A1 | 6/2008 | Nowak et al. | |
| 2009/0019824 | A1 | 1/2009 | Lawrence | |
| 2009/0077937 | A1 | 3/2009 | Privitt et al. | |
| 2009/0183477 | A1 | 7/2009 | Workman | |
| 2009/0301044 | A1 * | 12/2009 | Miller | B01D 46/0001 55/475 |
| 2009/0320426 | A1 * | 12/2009 | Braunecker | B01D 46/0013 55/511 |
| 2010/0192528 | A1 | 8/2010 | Mann et al. | |
| 2011/0314781 | A1 | 12/2011 | Greist et al. | |
| 2012/0227366 | A1 | 9/2012 | Aycock | |
| 2012/0297743 | A1 | 11/2012 | Schrage et al. | |
| 2013/0327004 | A1 | 12/2013 | Lise et al. | |
| 2015/0265957 | A1 * | 9/2015 | Fox | B03C 3/28 96/98 |
| 2015/0267927 | A1 * | 9/2015 | Zhang | F24F 3/1603 55/493 |

* cited by examiner

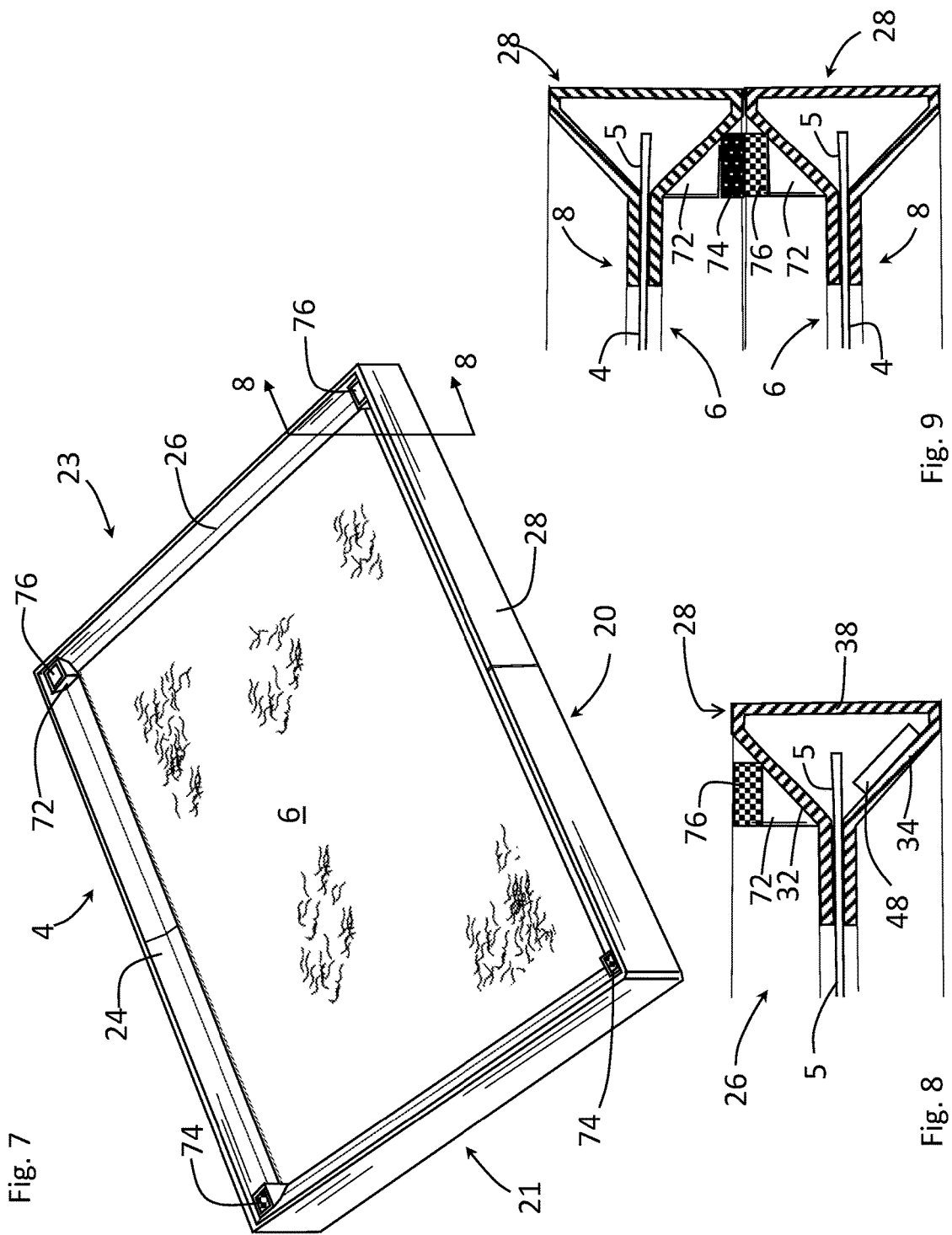

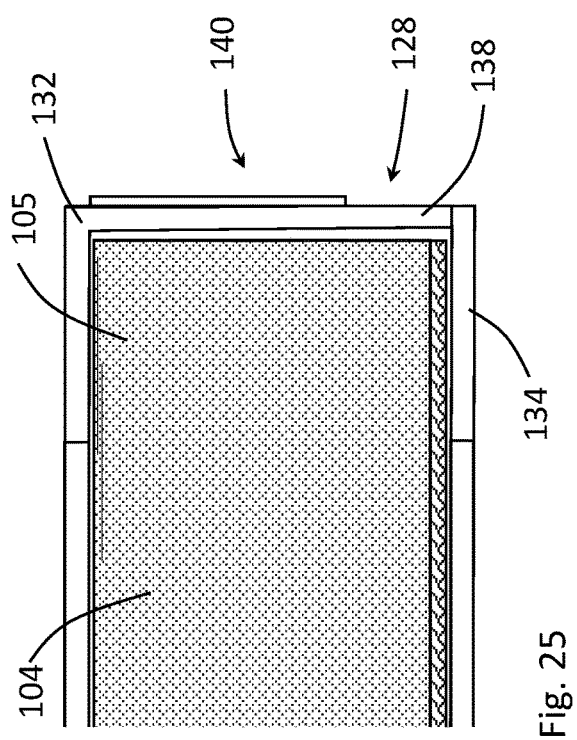
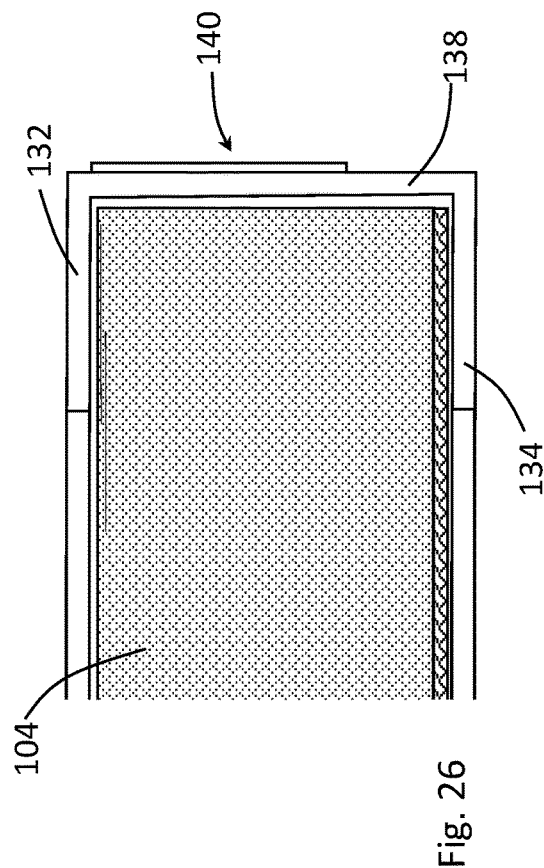

FOLDABLE FILTER FRAME

CROSS-REFERENCE TO RELATED APPLICATION

This application claims the benefit of U.S. Provisional Patent Application No. 62/314,637, filed on Mar. 29, 2016 and U.S. Provisional Patent Application No. 62/261,679, filed on Dec. 1, 2015, the disclosures of which are incorporated herein by reference.

FIELD OF THE INVENTION

This invention pertains to air filters used in heating and air conditioning systems.

BACKGROUND OF THE INVENTION

Forced air heating and air conditioning systems commonly include an air filter to remove particulates and other impurities from the circulating air. These air filters generally consist of a filter media (e.g., a fibrous mat or porous foam) that is held within a frame. The frame provides the air filter with mechanical strength and rigidity so as to facilitate mounting of the air filter in the air handling equipment. Frequently, these air filters must be replaced on a periodic basis. Alternatively, the air filters can be designed to be washable.

Unfortunately, the air filters that are commercially available for use in heating and air conditioning systems have a number of shortcomings. For example, the air filters have frames with a rigid rectangular shape to aid insertion into the heating and air conditioning equipment, typically by inserting the rectangular frame into opposed horizontal slots across an air duct. When a dirtied air filter frame is removed for disgarding, the rigid frame, the dirt and debris collected on the inlet air side of the filter can fall off the filter when placing the dirtied filter into a trash receptacle or trash bag.

SUMMARY OF THE INVENTION

A foldable filter frame is provided. The filter frame includes a filter media panel and a rectangular support frame surrounding the filter media panel. The support frame includes four edge elements. Each edge element is an elongated element having a base panel and opposed attaching panels extending from opposite edges of the base, including a dirty-side attaching panel and a clean-side attaching panel. Two of the edge elements are opposed end elements, and the other two edge elements are opposed side elements. The filter media panel is positioned and secured in planar form between the opposed attaching panels of the edge elements.

The frame elements can be formed by folding a planar blank of paperboard or cardboard sheet.

A hinge joint is formed along each side element. In an embodiment of the invention, the hinge joint is formed near the midpoint of each side element. The hinge joints allow the dirtied filter media panel to fold along or proximate lateral line, typical a centerline, one end against the other end. The hinge joint is formed in part by a fold line in the dirtied-side attaching panel, and a cut formed through the base panel and the clean-side attaching panel.

In one embodiment of the invention, the hinge joint includes a means for biasing the hinge joint to the planar, extended position, for insertion use in a furnace return air duct. The biasing means can include an elastic member that is secured to the clean-side attaching panel, extending across the cut the clean-side attaching panel. The elastic member can include an elastic film elastic fabric, or laminate thereof. The elastic member is secured to the clean-side attaching panel on opposite sides of the cut, by mechanical fixtures or adhesive fixtures. In an aspect of the invention, the elastic strip is applied and secured to an inside surface of the clean-side attaching panel. The elastic strips can stretch to allow the frame to fold in half, after becoming dirtied in use and removed from the return air duct, for inserting into a trash container or a trash bag more easily and with less mess and spillage of the dirt.

The elastic strip is typically secured to a surface of the blank in its relaxed, unstretched state. When the blank is folded, the elastic strip is disposed inside of the frame element.

In another embodiment, the hinge joint includes a hinge locking means for temporarily securing the hinge joint in the planar, extended position, for insertion into a furnace return air duct. The hinge locking means can include a no-stretch or low-stretch material that spans across the cut and is secured to the clean-side attaching panel or to the base panel, on both sides of the cut. The no-stretch or low-stretch member can include a thermoplastic or polymer film, a fabric layer, a paperboard layer, or laminate thereof. The hinge locking means can be secured by a mechanical fixture or an adhesive fixture. The hinge locking means when secured to the support frame resists and prevents the frame from folding along the hinge joint. After the filter medium has become dirtied in use and has been removed from the return air duct, the hinge locking means can be removed or loosened from securement to the clean-side attaching panel or the base panel, or torn laterally through between the secured ends, thereby allowing the dirtied filter media panel to fold at the hinge joint, for inserting into a trash container or a trash bag more easily and with less mess and spillage of the dirt.

In another embodiment, the hinge locking means can include an adhesive tape member that is applied and secured adhesively across the cut on either the clean-side attaching panel or the base panel, or both. Typically, one end of the adhesive tape member is provided with a tab that extends from the panel surface to allow a user's fingers to grasp and pull the adhesive tape member away from the panel. Removing the adhesive tape member from the panel allows the filter frame to fold at the hinge joint.

In another embodiment, the hinge locking means can include an adhesive strap member that is applied and secured adhesively across the cut on either the clean-side attaching panel or the base panel, or both. The adhesive strap member has a frangible line or area across laterally, and maintains its structure when applied to the panels and when placed under low or moderate tension along it longitudinal axis, such as when the frame is handled and inserted into the air duct. The adhesive strap member is also configured to split or break across laterally when placed under high or aggressive tension along it longitudinal axis, or when punctured, cut or torn, so that the two opposed secured parts of the adhesive strap member are separated, allowing the filter frame to fold at the hinge joint. The adhesive strap member and its frangible line or area can be punctured or sliced by cutting or penetrating the thickness with a sharp point or edge that spontaneously splits or breaks across laterally into the two parts.

The hinge locking means is typically secured to a surface of the blank which is then folded into the filter frame with the hinge locking means disposed on an outer-facing surface of the clean-side attaching panel or the base panel. Alternatively, the hinge locking means can be secured to the outer-facing surface of the clean-side attaching panel or the base panel after the frame is formed.

A further invention includes a foldable air filter including a filter media panel and a rectangular support frame surrounding the filter media panel, and including a hinge joint that includes a line of perforations through a base panel and a clean-side attaching panel of the opposed side frame elements of the support frame. The bridging tabs between the perforations of the base panel and the clean-side attaching panel can be broken or torn to separate the base panel and the clean-side attaching panel into two halves, to permit folding the foldable air filter along a fold line through a clean-side attaching panel aligned with the line of perforations.

In another aspect of the invention, the foldable filter includes a means for holding the frame in the folded position, to reduce the instances of the folded frame coming opened and spilling the dirt and debris on the dirtied side. The holding means can be disposed in the corners of the end elements or along the length of the end and/or side elements of the frame. The holding means can include mechanical fasteners, or an adhesive fastener, such as pressure adhesive tape. A support can be positioned in each corner of the frame, or along the length of a frame element to secure and position the holding means in positions where the mating holding means will attach to one another, or where the holding means can attach to a portion of a frame element.

In another invention disclosed herein, a filter frame can include a handle fixed to an outwardly-facing surface of at least one of the four edge members, the handle including a grasping surface that is configured to extend partially away from the outwardly-facing surface, and is configured for grasping of the handle and pulling the filter frame out of an air duct.

In a further aspect of the invention, the handle includes a base fixed to the outwardly-facing surface of the edge member, and a tab attached to and extending from the base, which can be grasped between one's fingers for pulling the filter frame out from between the opposed slots across an air duct. In a further aspect of the invention, at least two handles are fixed at opposite ends of the outwardly-facing surface of the edge member, for grasping and pulling at both ends of the filter frame.

BRIEF DESCRIPTION OF THE FIGURES

FIG. 7 shows the foldable air filter that includes a means for holding the frame in the folded position shown in FIG. 6.

FIG. 8 shows a section view of a portion of the frame that include the frame holding means, as viewed through line 8-8 of FIG. 7.

FIG. 9 shows a section view of a portion of the folded frame that include the frame holding means, as viewed through line 9-9 of FIG. 6.

FIG. 25 shows a section view of the frame and the hinge locking means of FIG. 24 through line 25-25.

FIG. 26 shows a section view of the frame and the hinge locking means of FIG. 24 through line 26-26.

DETAILED DESCRIPTION OF THE INVENTION

Figure 1:
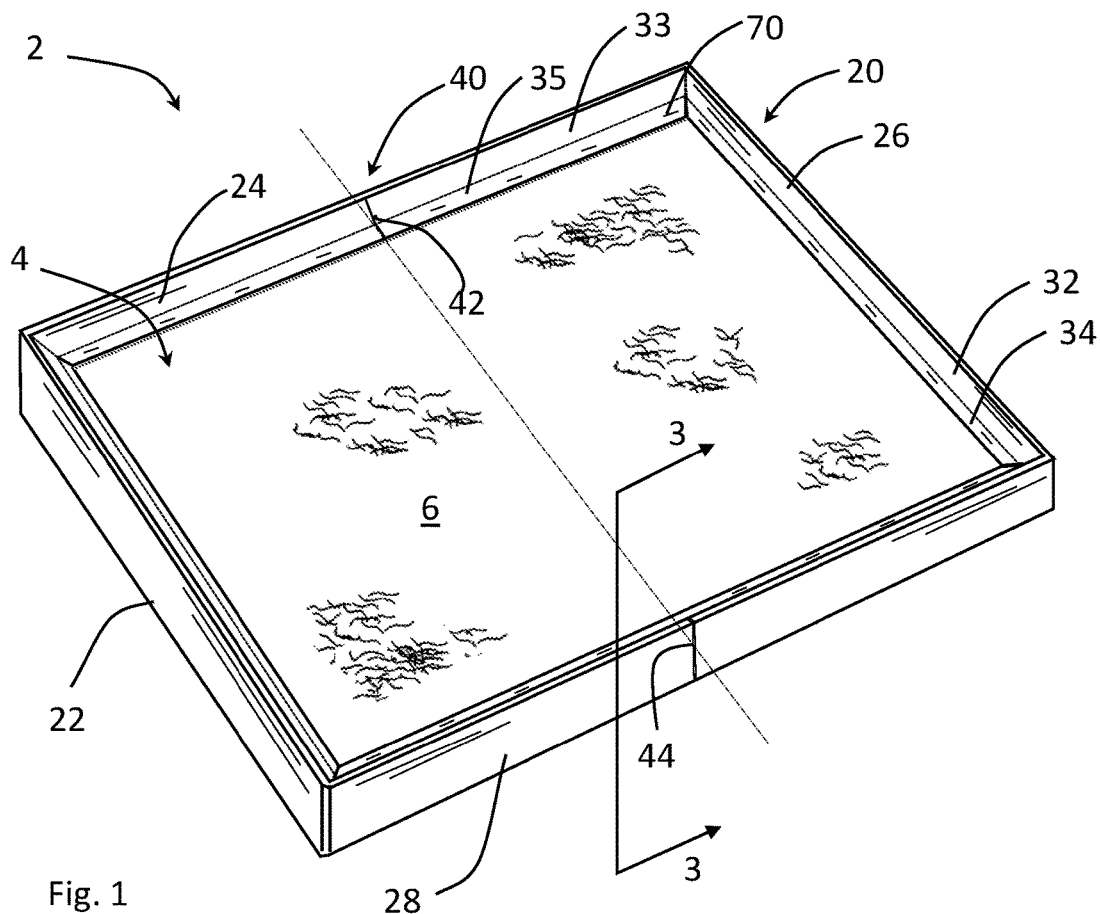
FIG. 1 shows a perspective top side view of a foldable air filter with a frame and a filter media.
Figure 2:
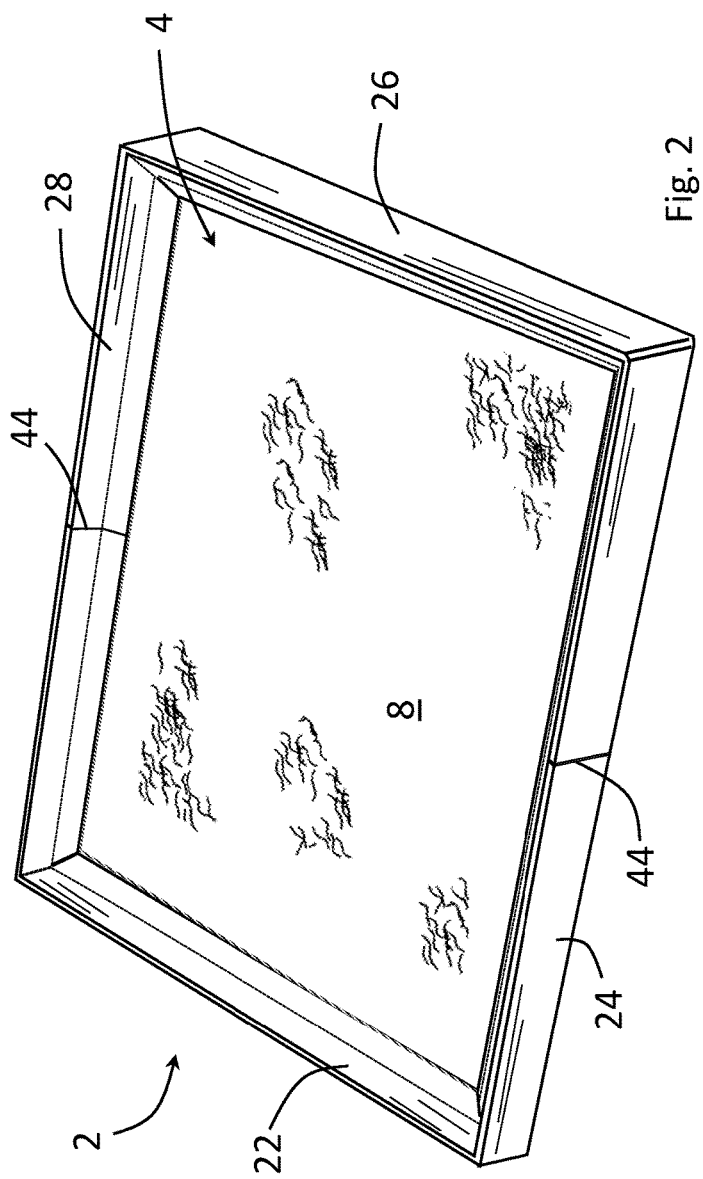
FIG. 2 shows a bottom side view of the foldable air filter.

FIG. 1 shows a top view of an air inlet face of a foldable air filter 2. FIG. 2 is a bottom view of the foldable air filter 2, flipped over to show an air outlet face. The foldable air filter 2 includes a filter media panel 4 and a rectangular support frame 20 surrounding the filter media panel 4. The filter media panel 4 has an upper, dirtied side 6 and a clean side 8. The support frame 20 includes four edge elements 22, 24, 26, 28.

Figure 3:
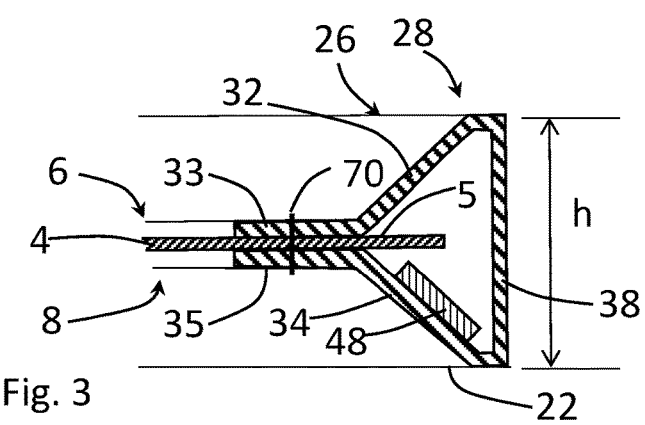
FIG. 3 shows a section view of a portion of the frame through line 3-3 of FIG. 1.

FIG. 3 is a section view through the side element 28. Each edge element is an elongated element having a base 38 and opposed attaching panels 32, 34 extending taperingly from opposite lateral edges of the base 38. Two of the edge elements are opposed end elements 22,26, and the other two edge elements are opposed side elements 24,28. The material of the frame 20 is typically cardboard or paperboard, although other materials such as a thermoplastic can be used. The filter media panel 4 is a flexible layer that extends substantially in a plane, with edge portions 5 that are positioned and secured with a fastener, illustrated as a staple 70, between distal portions 33 and 35 of the attaching panels 32, 34, respectively, as shown in FIGS. 1 and 3.

Figure 5:
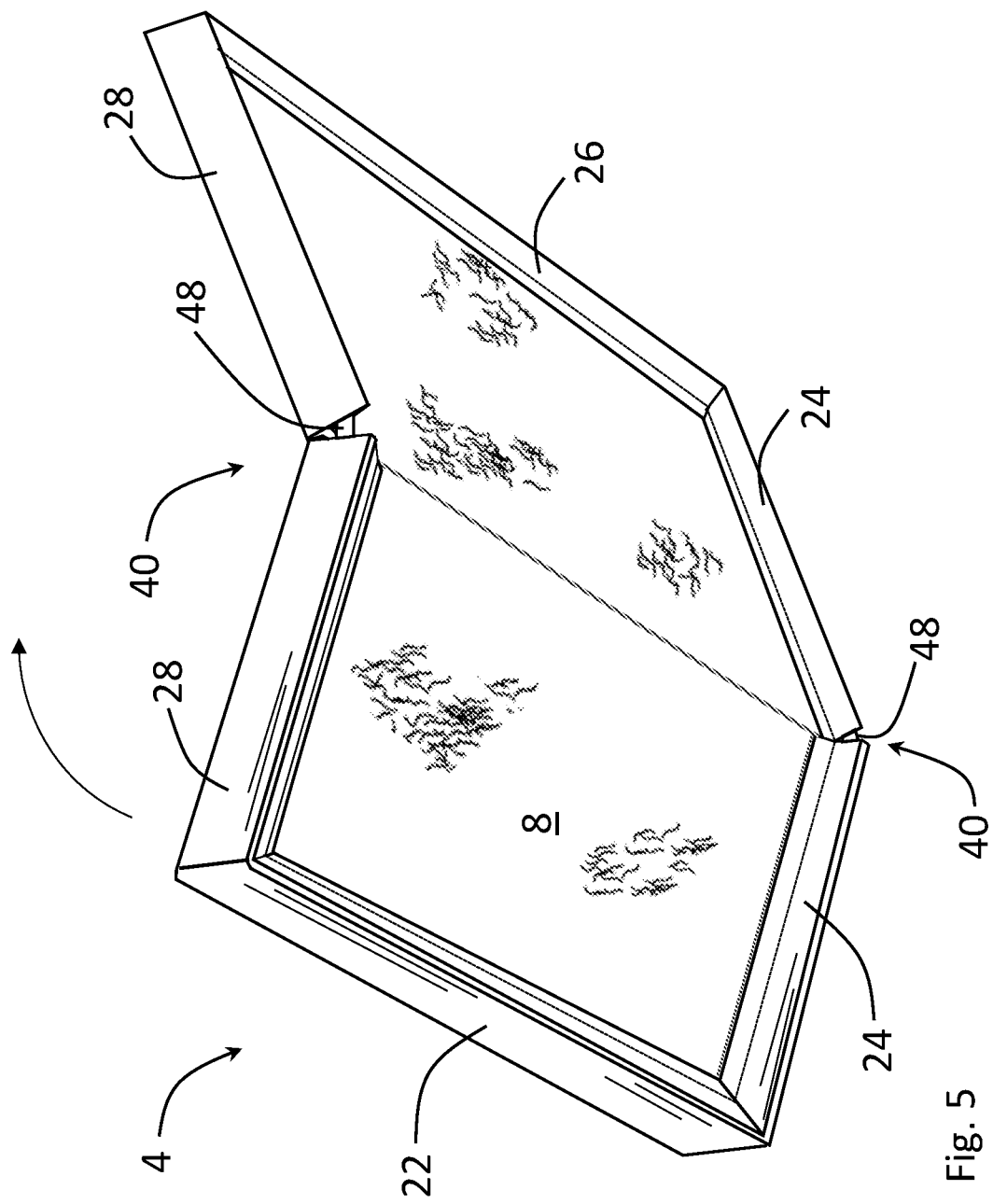
FIG. 5 shows the underside of the foldable air filter with the side elements of the frame being folded.
Figure 6:
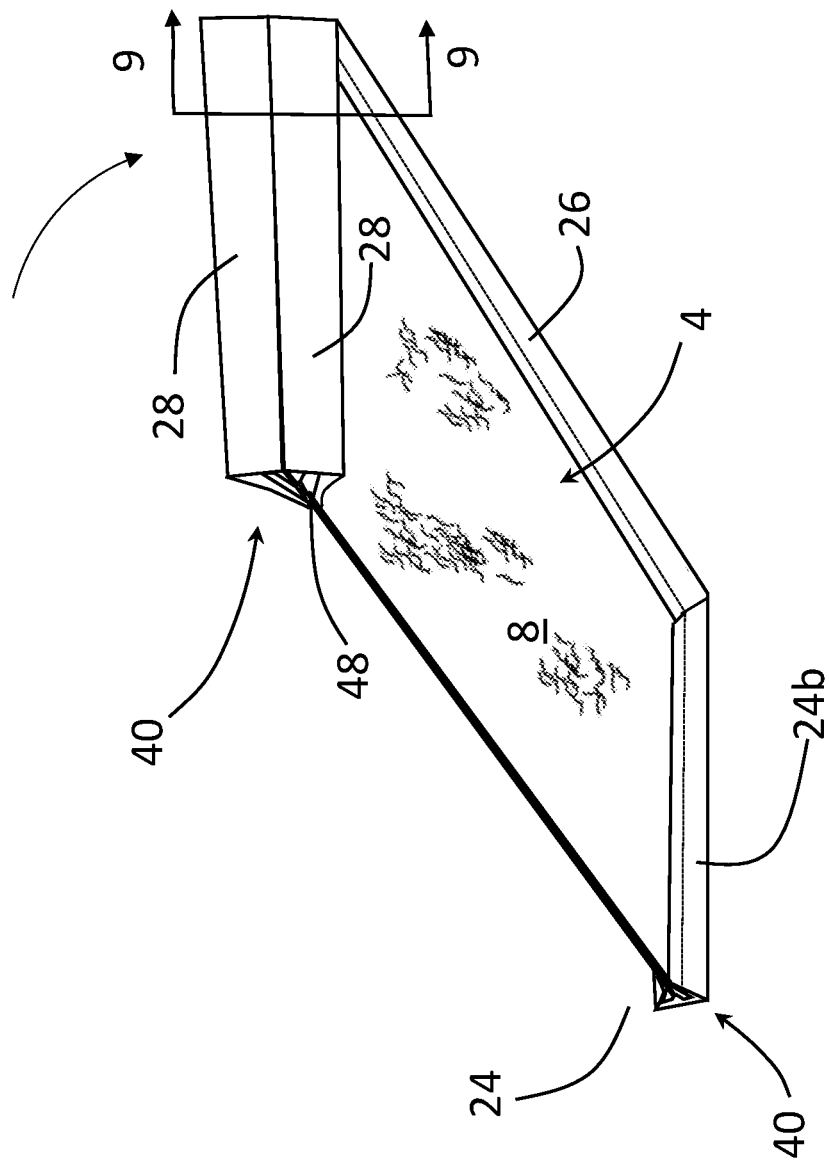
FIG. 6 shows the foldable air filter in a folded position.

A hinge joint 40 is formed near the midpoint of each side elements. The hinge joints 40 allow the upper dirtied side 6 of the filter media panel 4 to fold against itself, one end against the other end. The hinge joint 40 is formed in part by a fold line 42 in the upper or dirtied-side attaching panel 32, and a cut formed through the base 38 and the lower or clean-side attaching panel 34. The cut 44 frees the formed frame 20 to be folded in half, as shown in FIGS. 5 and 6.

The hinge joint 40 also includes a means for biasing the hinge joint to the extended, planar position of FIG. 1. In the illustrated embodiment, the biasing means is an elastic member 48 that is secured to the lower attaching panel 34 across the cut 44. The elastic member 48 can be an elastic film, elastic fabric, or laminate thereof. An example of the elastic member can be strip of latex film. The elastic member 48 can be secured to the lower attaching panel 34 by a securement, including a mechanical fixture, such as a staple 56 shown in FIG. 4A, or an adhesive fixture. The securements are applied at opposed ends of the elastic strip 48, substantially equidistant from the cut line 44. In the illustrated embodiment, the elastic strip 48 can be applied to an inside surface of the lower attaching panel 34. The elastic strips 48 pull the two portions 34a,34b of the lower attaching panel 34 to bias the frame 20 into the planar frame embodiment shown in FIG. 1 for insertion into an air duct. The elastic strips 48 stretch to allow the frame to fold in half, after use, for inserting into a trash container or a trash bag more easily and with less mess and spillage of the dirt.

Figure 4B:
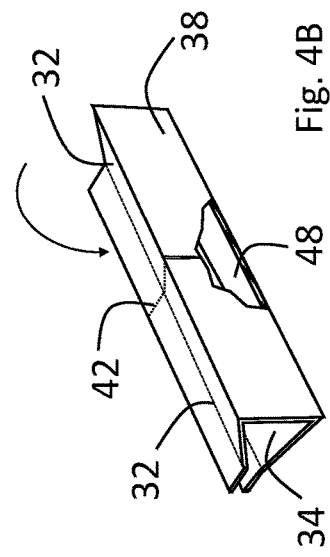
FIG. 4B shows the portion of the blank of sheet material folded into a frame element.
Figure 4A:
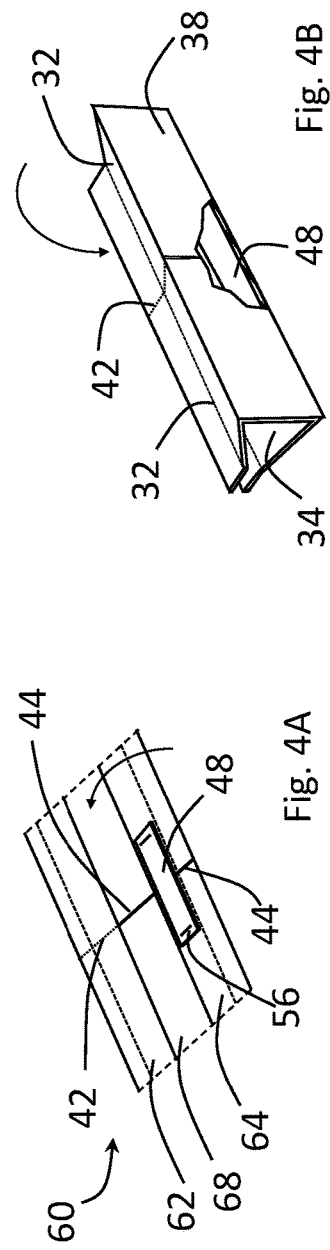
FIG. 4A shows a portion of a blank of sheet material used to form the frame elements.

FIG. 4A shows a portion of a planar blank 60 of material that is folded to form the length of the side element 28. The blank portion 60 includes to first lateral portion 62, a center portion 68, and a second lateral portion 64. The elastic strip 48 is secured to the upper surface of the second lateral portion 64, across the cut line 44 with staples 56. When applied and secured, the elastic strip 48 can be in its relaxed, un-stretched state.

As shown in FIG. 4B, the blank 60 is then folded (arrows) lengthwise along the fold lines separating the panels, into the side element 28. The lower lateral portion 62 and the upper lateral portion 64 are folded into the lower attaching panel 34 and the upper attaching panel 32, respectively, and the center portion 68 into the base 38 of the side element 28.

The width of the base 38 defines the height "h" of the frame 20, and is typically a standard dimension for securing an air filter into a return duct of typical home heating furnace. Likewise, the length (side elements 24,28) and width (end elements 22,26) of the frame 20 are typically standard dimension to traverse the same return duct. The shape of the filter frame can be rectangular, including square.

In another embodiment of the invention, the foldable air filter includes a means for holding the frame 20 in the folded position as shown in FIG. 6. FIG. 7 shows a holding means as pairs of opposed mechanical fasteners disposed in the corners of the end elements 22,26, with the side elements 24,28. A pair of first mechanical fasteners 74 are positioned at one end 21 of the frame, and a pair of second mating mechanical fasteners 76 are positioned at the other end 23 of the frame. For example, if the first mechanical fastener 74 is a hook member, the second mating mechanical fastener 76 is a loop member, and vice versa. Each holding means (mechanical fastener) is positioned at, or just slightly below, the upper plane 200 of the frame 20, as shown in FIG. 8, to avoid being peeled away when the air filter is inserted into the furnace return air duct. A support 72 can be positioned in each corner of the frame to secure and position the holding means substantially parallel with the frame. The support 72 can be a folded paperboard structure or molded plastic structure, shaped to the contour of the frame. When the frame 20 is folded in half, as shown in FIG. 9, the mechanical fasteners mate and secure the folded halves of the frame together. This reduces the instances of the folded frame coming opened and spilling the dirt and debris.

Figure 10:
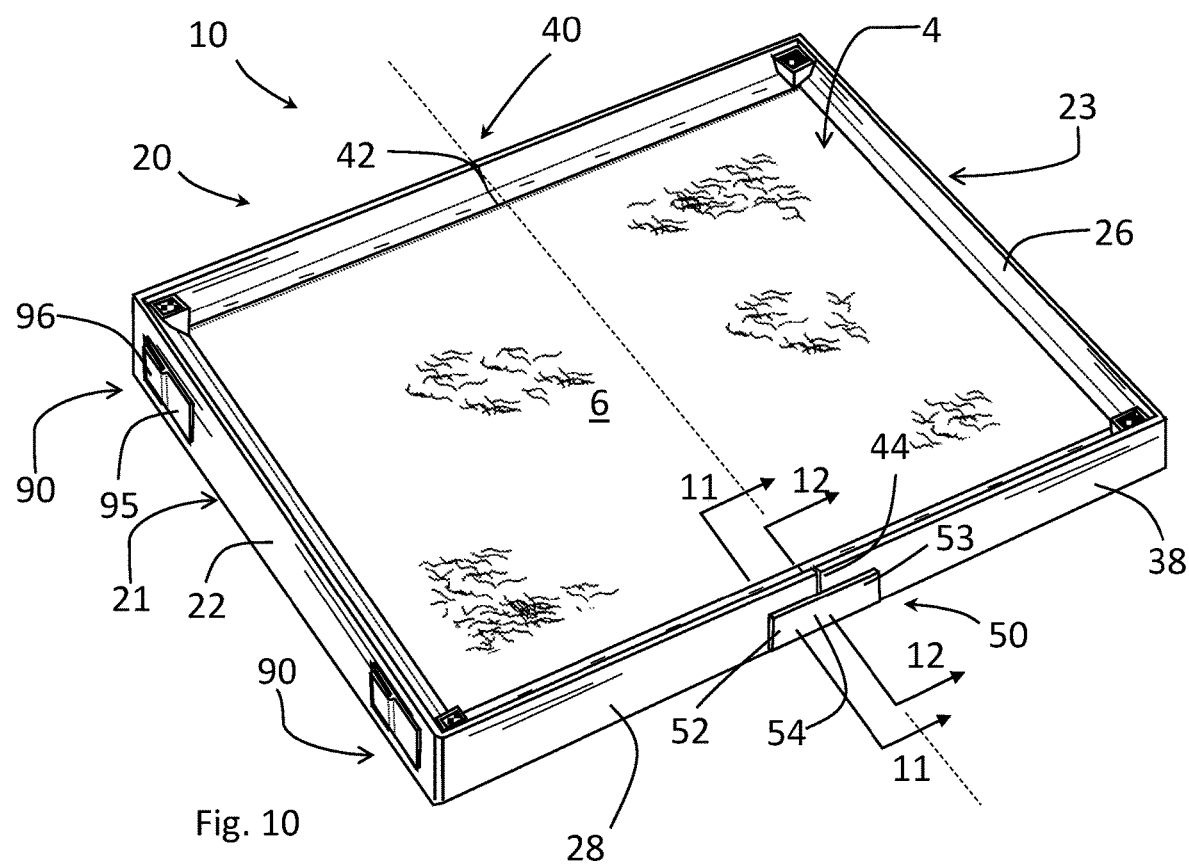
FIG. 10 shows a perspective top side view of a foldable air filter with a frame and a filter media, including a hinge locking means secured to a base panel across a cut of the hinge joint.
Figure 12:
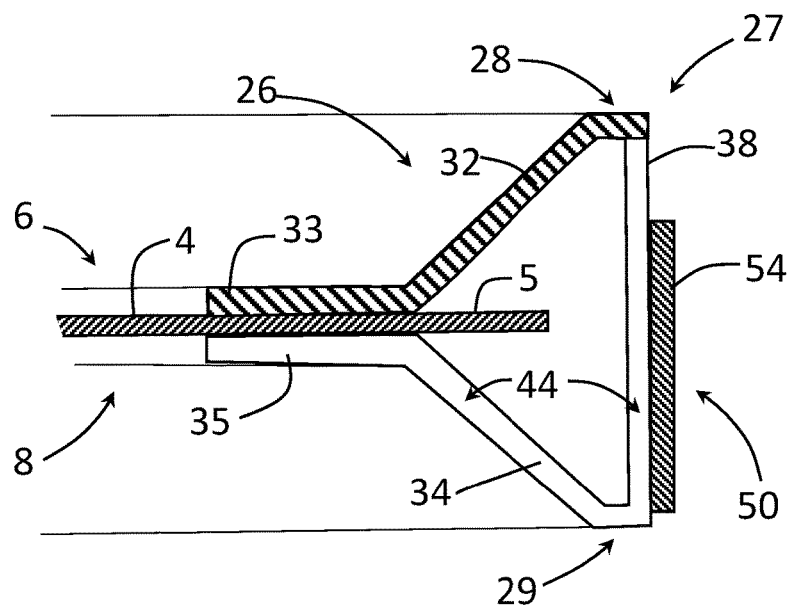
FIG. 12 shows a section view of the frame and the hinge locking means of the foldable air filter, as seen through line 12-12 of FIG. 10.
Figure 13:
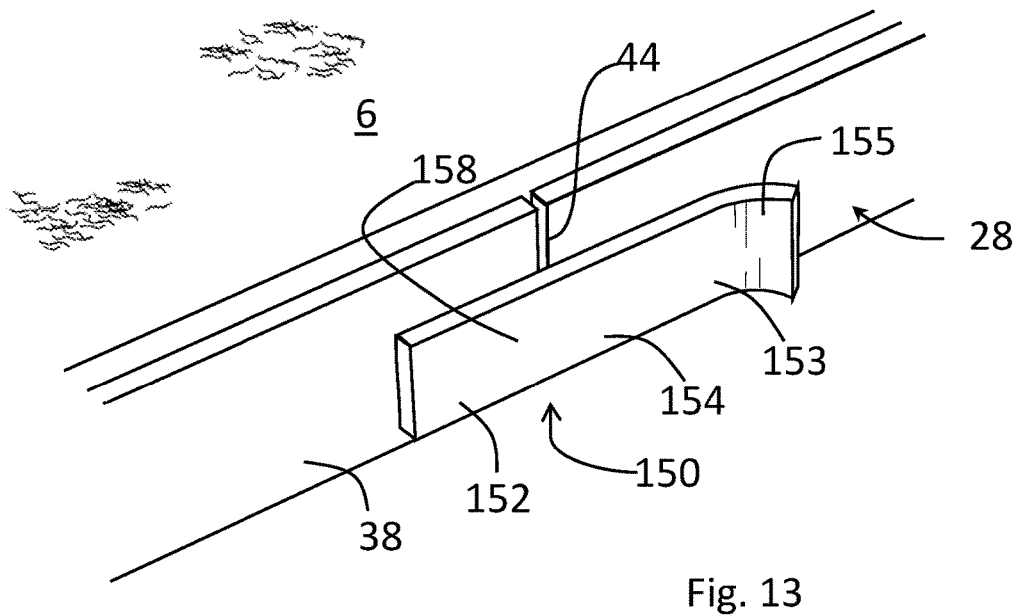
FIG. 13 shows a detailed view of an adhesive tape member with a tab, attached across the cut in the base panel of the frame.
Figure 15:
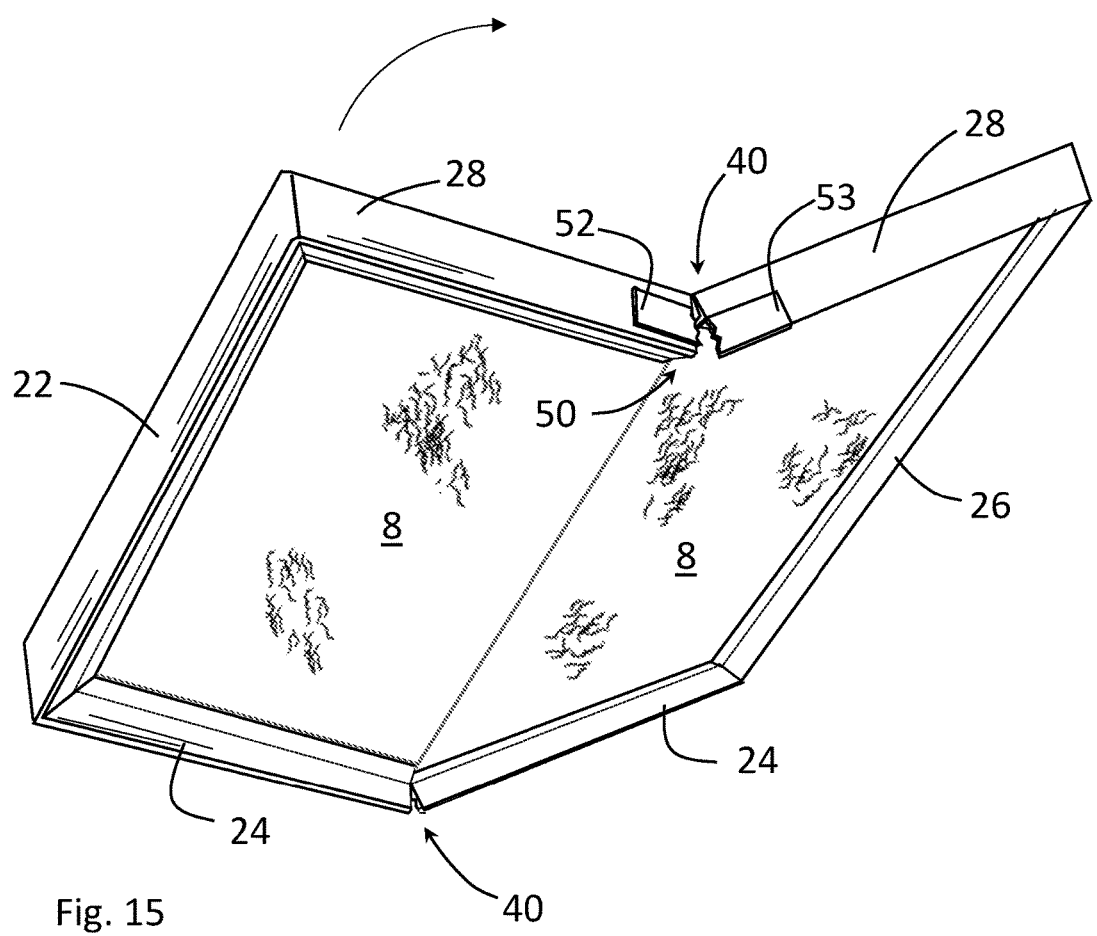
FIG. 15 shows the foldable air filter of FIG. 10 with the hinge locking means torn, and the folding of the frame.
Figure 16:
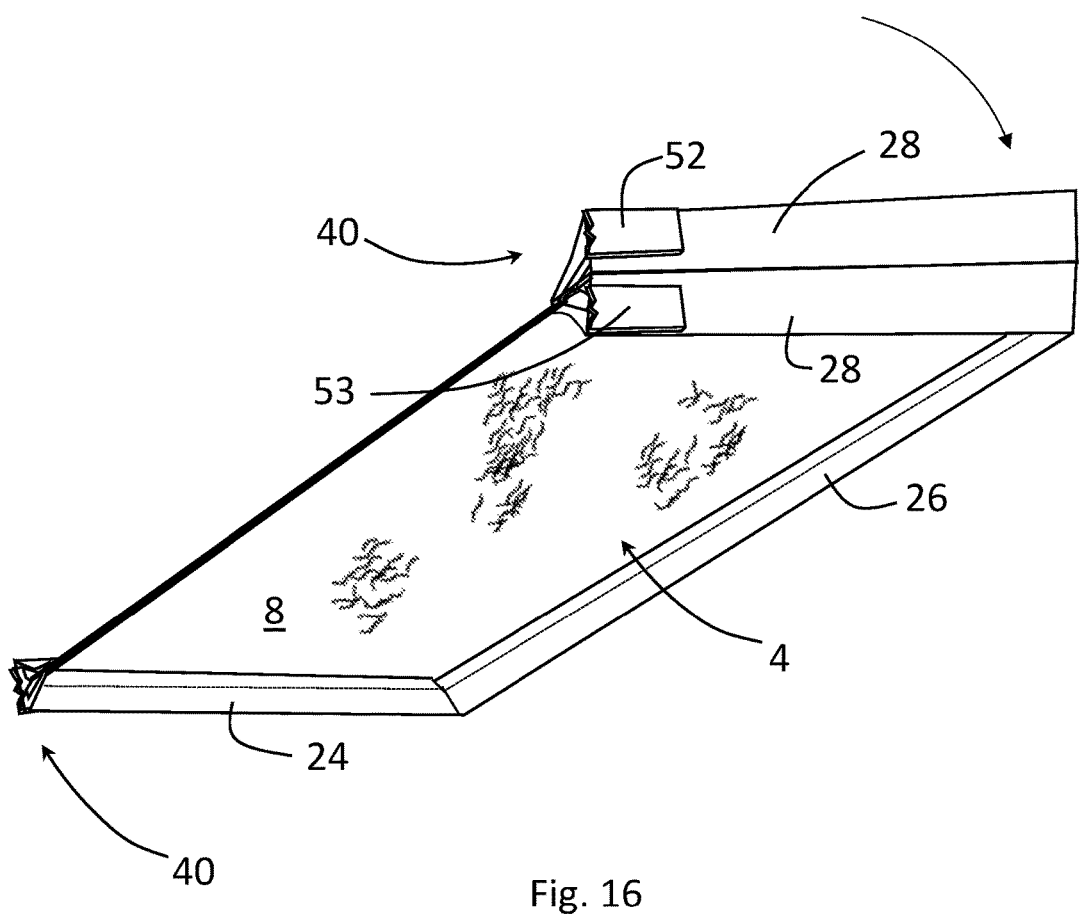
FIG. 16 shows the foldable air filter of FIG. 15 that includes a means for holding the frame in the folded position.

FIG. 10 shows top view of an air inlet face of another embodiment of a foldable air filter 10, which includes the filter media panel 4 and the rectangular support frame 20 surrounding the filter media panel 4. FIGS. 12 and 13 are section views through the side element 28 with a hinge joint 40 and a hinge locking means 50. The hinge joint 40 is formed near the midpoint of the side element 28. The hinge joints 40 allow the dirtied filter media panel 4 to fold against itself, one end 21 against the other end 23, as shown in FIGS. 15 and 16. The hinge joint 40 is formed in part by a fold line 42 in the upper or dirtied-side attaching panel 32, and a cut 44 formed through the base panel 38 and the lower or clean-side attaching panel 34. The cut 44 frees the formed frame 20 to be folded in half, as shown in FIGS. 15 and 16.

Figure 11:
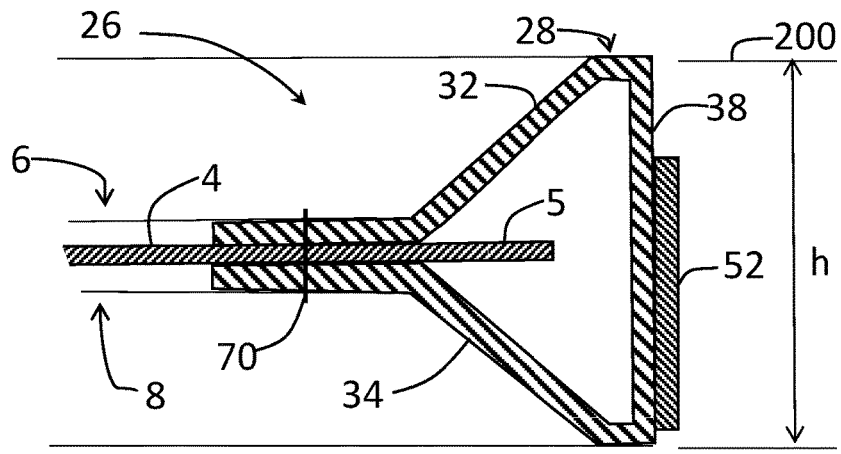
FIG. 11 shows a section view of the frame and the hinge locking means of the foldable air filter, as seen through line 11-11 of FIG. 10.

The hinge locking means 50 along each of the side elements 24,28, is secured at its opposed ends 52,53 to the base panels 38 (FIG. 11), and having a center portion 54 that span across the cut 44 (FIG. 12).

FIG. 13 shows an embodiment of the hinge locking means 50 that includes an adhesive tape member 150 having an outer surface 157 and an inner adhesive surface 158 that attaches adhesively to the base panel 38 at both ends 152,153, and optionally proximate the center portion 154. A tab 155 is formed at end 153 to provide a grasping end for tearing selectively away the adhesive tape member 150 from the base panels. The tab 155 can be a non-adhesive, non-adhering extension of the adhesive tape member 150 as specifically shown in FIG. 13, or a folded-over portion of the end 153 of the adhesive tape member 150.

Figure 14:
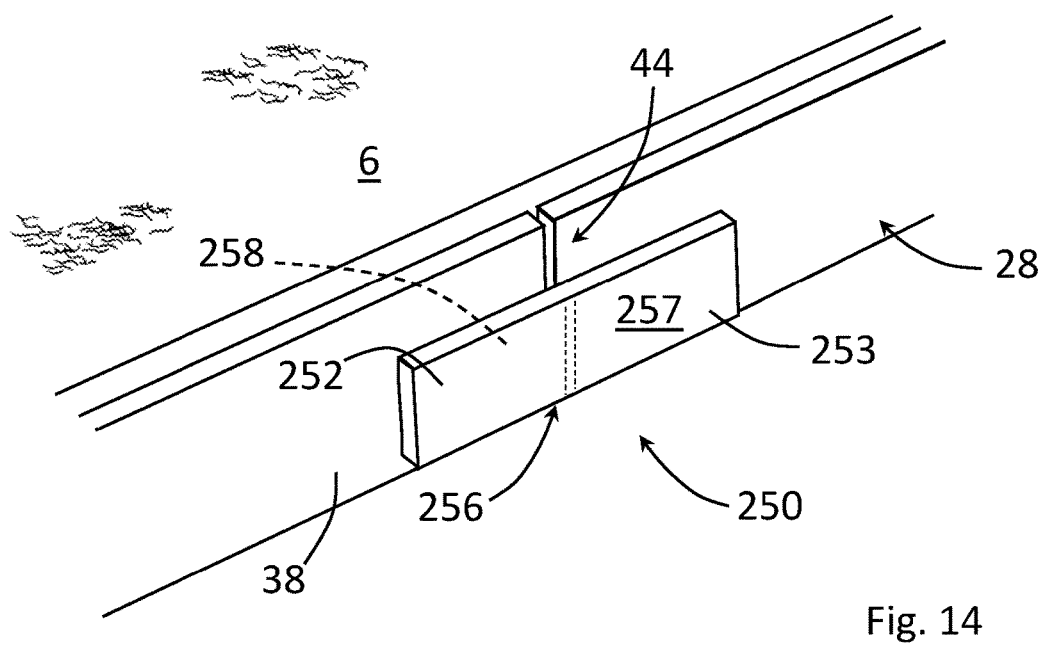
FIG. 14 shows a detailed view of an adhesive strap member with a frangible tear line, attached across the cut in the base panel of the frame.

FIG. 14 shows an embodiment of the hinge locking means that includes an adhesive strap member 250 having an outer surface 257 and an inner adhesive surface 258 that attaches adhesively to the base panel 38 at both ends 252,253. The adhesive strap member 250 has a frangible area 256 across laterally the adhesive strap member 250 that spans the cut 44 of the hinge joint 40, which can be split or broken across laterally so that the two opposed, secured parts 56a,56b of the adhesive strap member 250 separate (FIG. 15).

In alternative embodiments, the locking means can include a strap member that has the opposed ends secured to the base panel 38, across the cut 44, using a mechanical fastener, such as a staple or rivet, as opposed to an adhesive layer.

Figure 17:
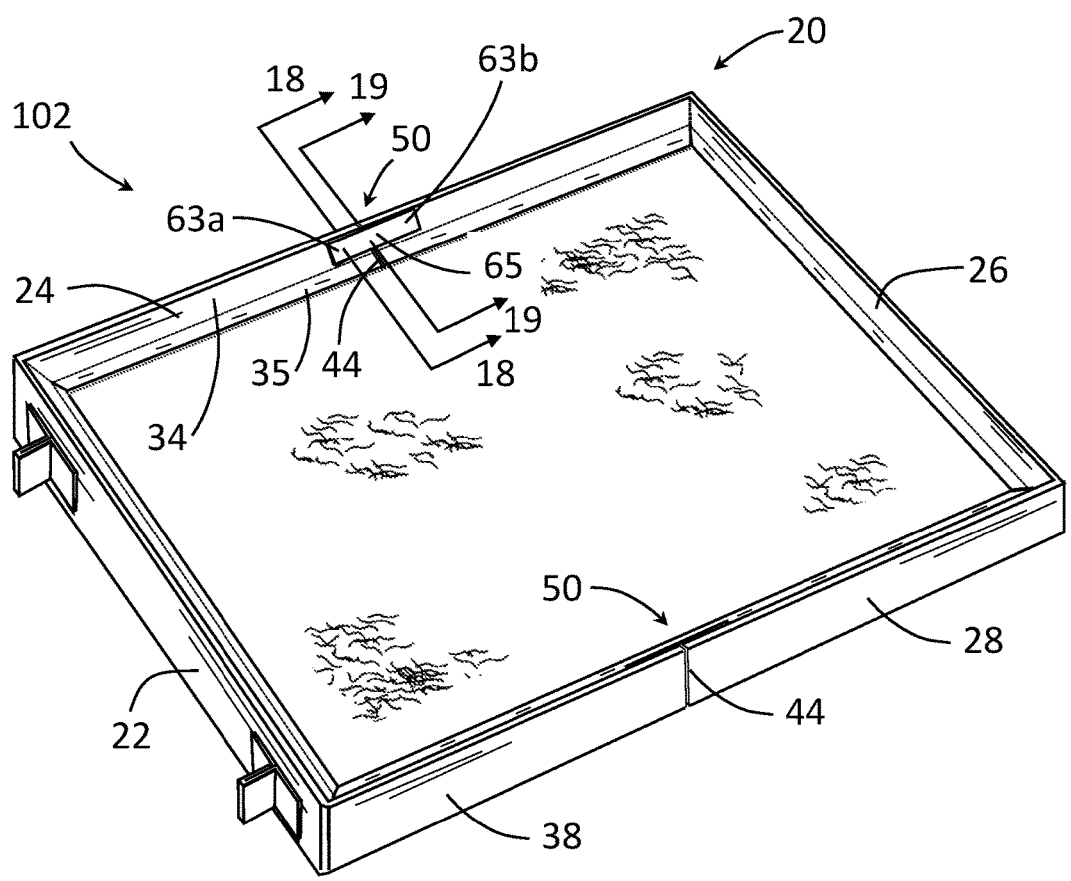
FIG. 17 shows a perspective top side view of a foldable air filter that includes another embodiment of a hinge locking means secured to a clean-side attaching panel across a cut of the hinge joint.
Figure 18:
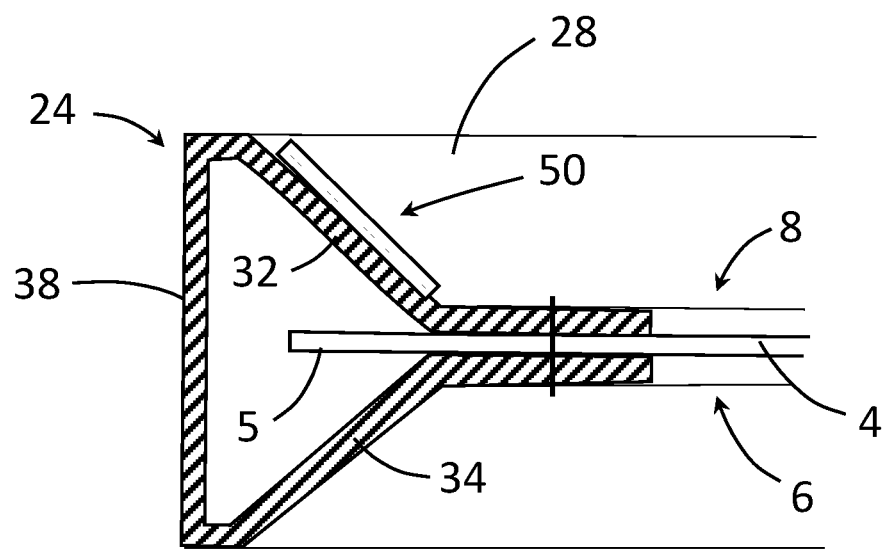
FIG. 18 shows a section view of the frame and the hinge locking means of the foldable air filter of FIG. 17, as seen through line 18-18.
Figure 19:
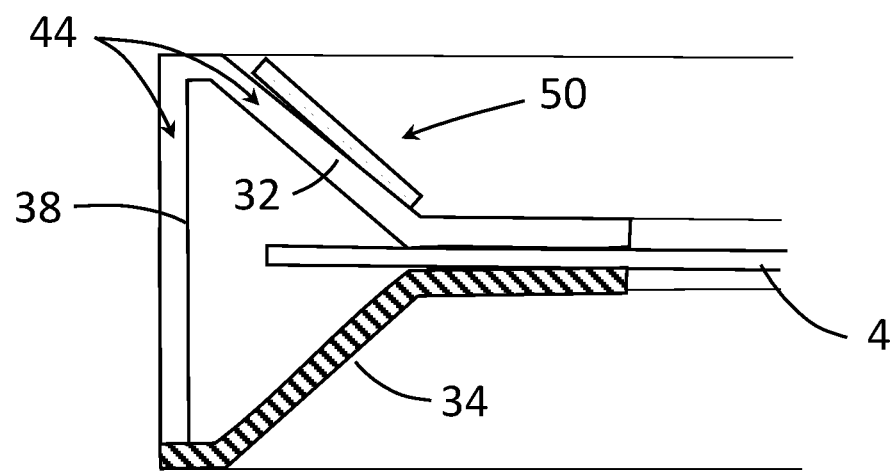
FIG. 19 shows a section view of the frame and the hinge locking means of the foldable air filter of FIG. 17, as seen through line 19-19.

FIGS. 17-19 show another embodiment of a foldable filter 102 that includes the hinge locking means 50 along each of the side elements 24,28, and secured at its opposed ends 63a,63b to the clean-side attaching panel 34, and having a center portion 65 that spans across the cut 44. The hinge locking means 50 can also include an adhesive tape member attached having an adhesive surface, as described herein for adhesive tape member 150, or an adhesive strap member attached with an adhesive surface, as described herein for adhesive tape member 250. The hinge locking means 50 can include a strap member that has the opposed ends secured to the clean-side attaching panel 34, across the cut 44, using a mechanical fastener, such as a staple or rivet, as opposed to an adhesive layer.

Figure 20:
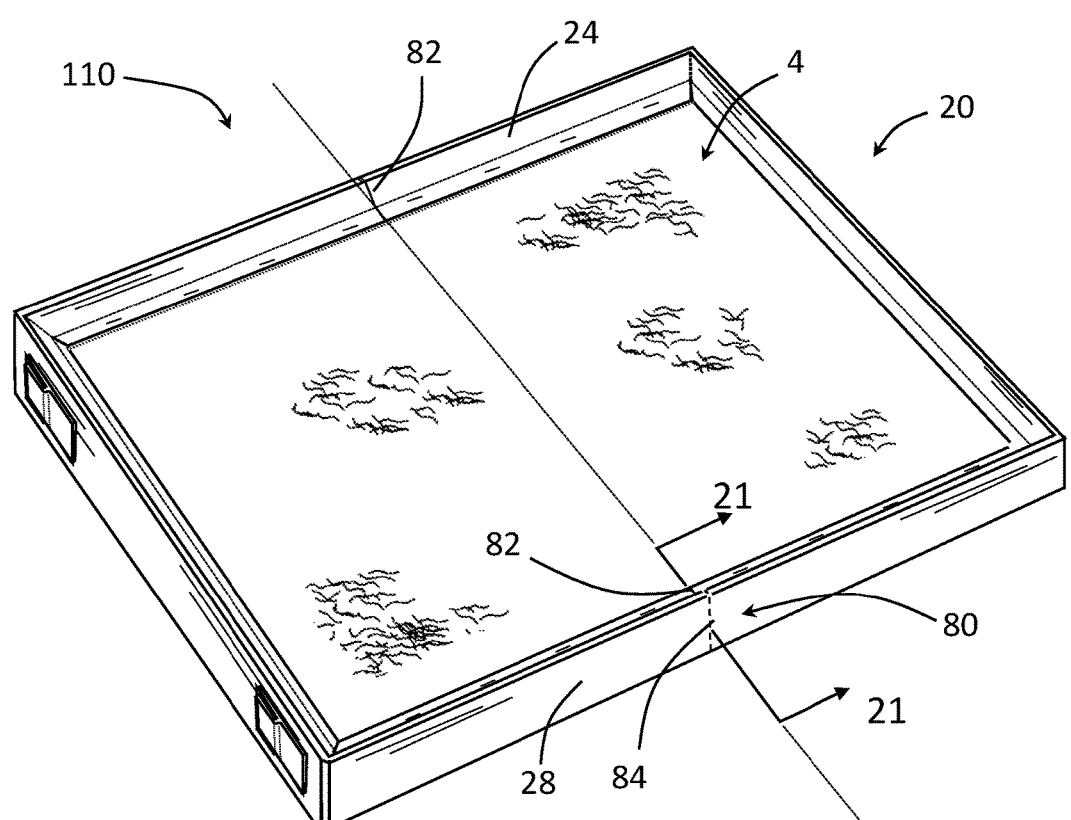
FIG. 20 shows a perspective top side view of another embodiment of a foldable air filter with a frame and a filter media, including a hinge locking means that includes a line of perforations.
Figure 21:
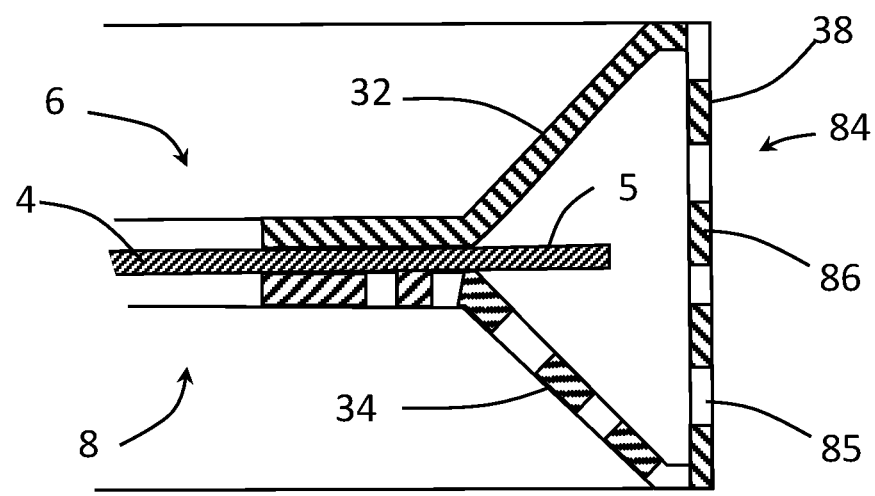
FIG. 21 shows a section view of the frame and the hinge locking means as seen through line 21-21 of FIG. 20.

In another embodiment of the invention shown in FIGS. 20 and 21, a foldable air filter 110 includes a filter media panel 4 and a rectangular support frame 20 surrounding the filter media panel 4, and a perforated hinge joint 80 disposed in opposite side elements 24,28 of the support frame 20. The perforated hinge joint 80 includes a line of perforations 84 extending laterally through the base panel 38 and the clean-side attaching panel 34 of each opposed side frame element, and a fold line 82 extending laterally through the dirty-side attaching panel 32. The bridging tabs 86 between the perforations 85 of the base panel 38 and the clean-side attaching panel 34 are sufficiently wide and numerous to hold together the two halves of each side frame element 24 and 28 during normal use, including during insertion of the foldable air filter into an air duct, yet are sufficiently few in number and narrow to permit a user to tear or break the bridging tabs 86 with an implement or utensil, or one's finger, to allow the foldable air filter to fold along the hinge joint 80 for disposal.

Figure 22:
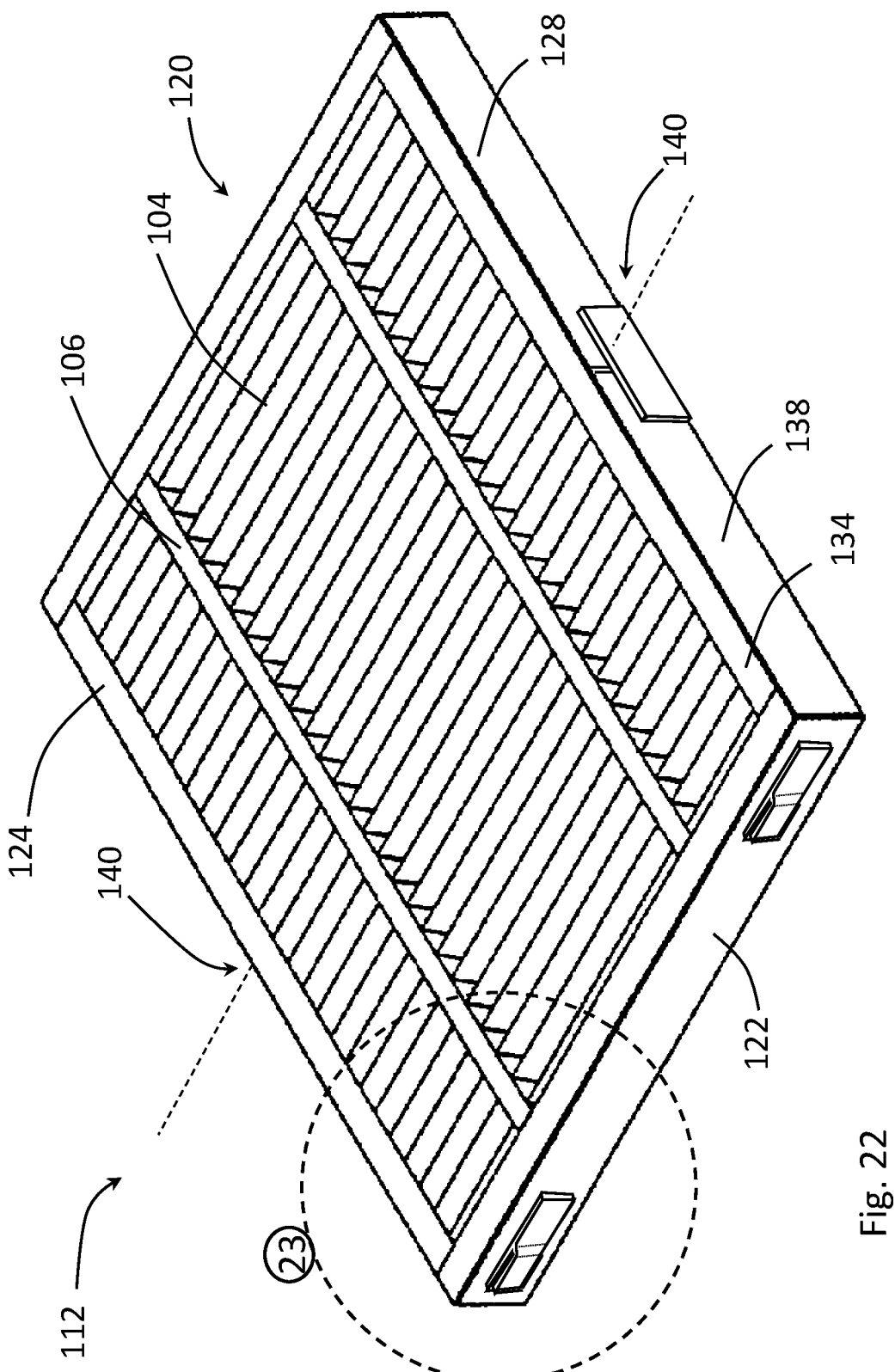
FIG. 22 shows a perspective top side view of an embodiment of a foldable pleated air filter with a frame and a pleated filter media, including a hinge locking means secured to a base panel across a cut of the hinge joint.
Figure 23:
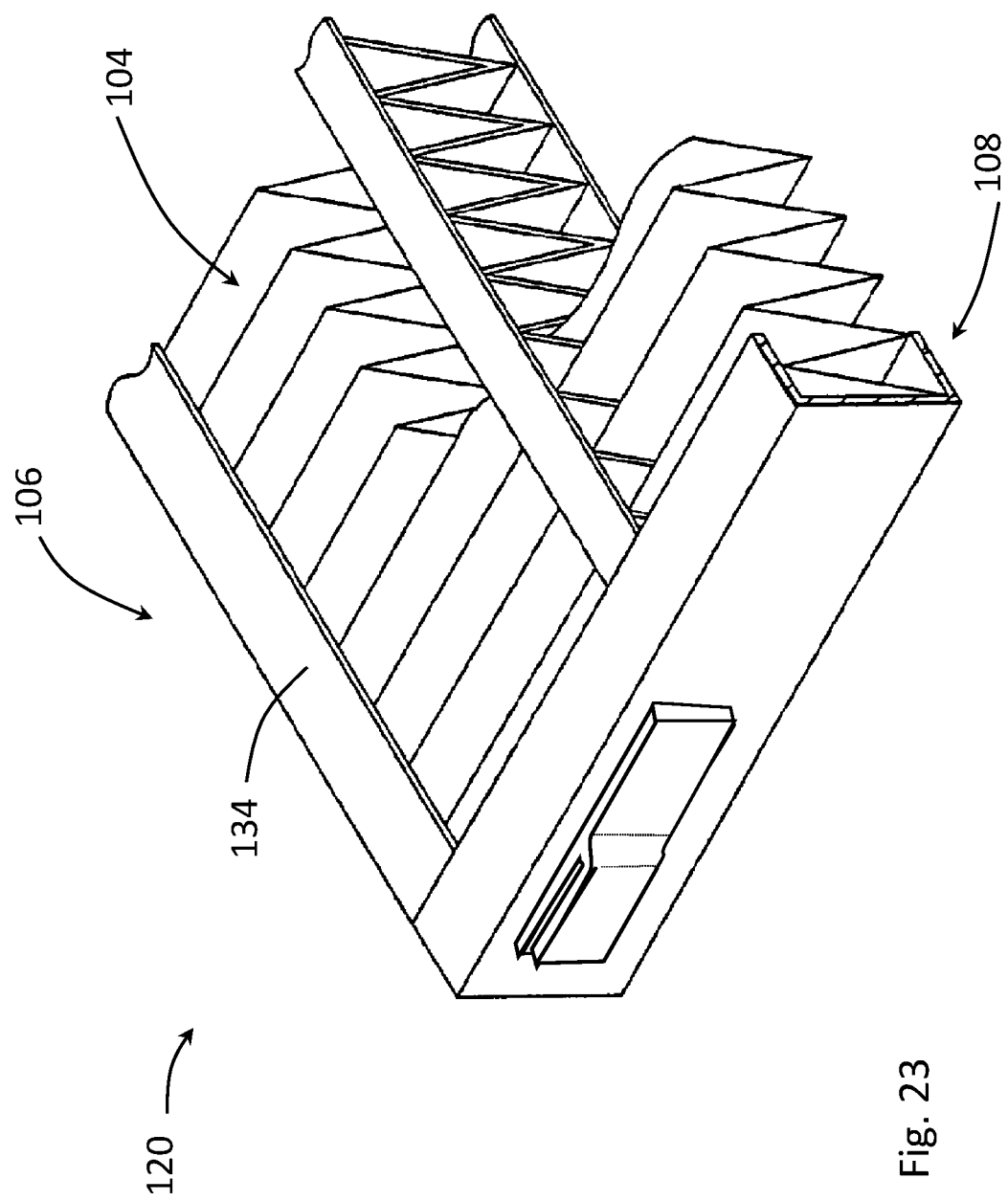
FIG. 23 shows an enlarged cut-away view of a portion of the foldable pleated air filter of FIG. 22 showing the pleated filter media.
Figure 24:
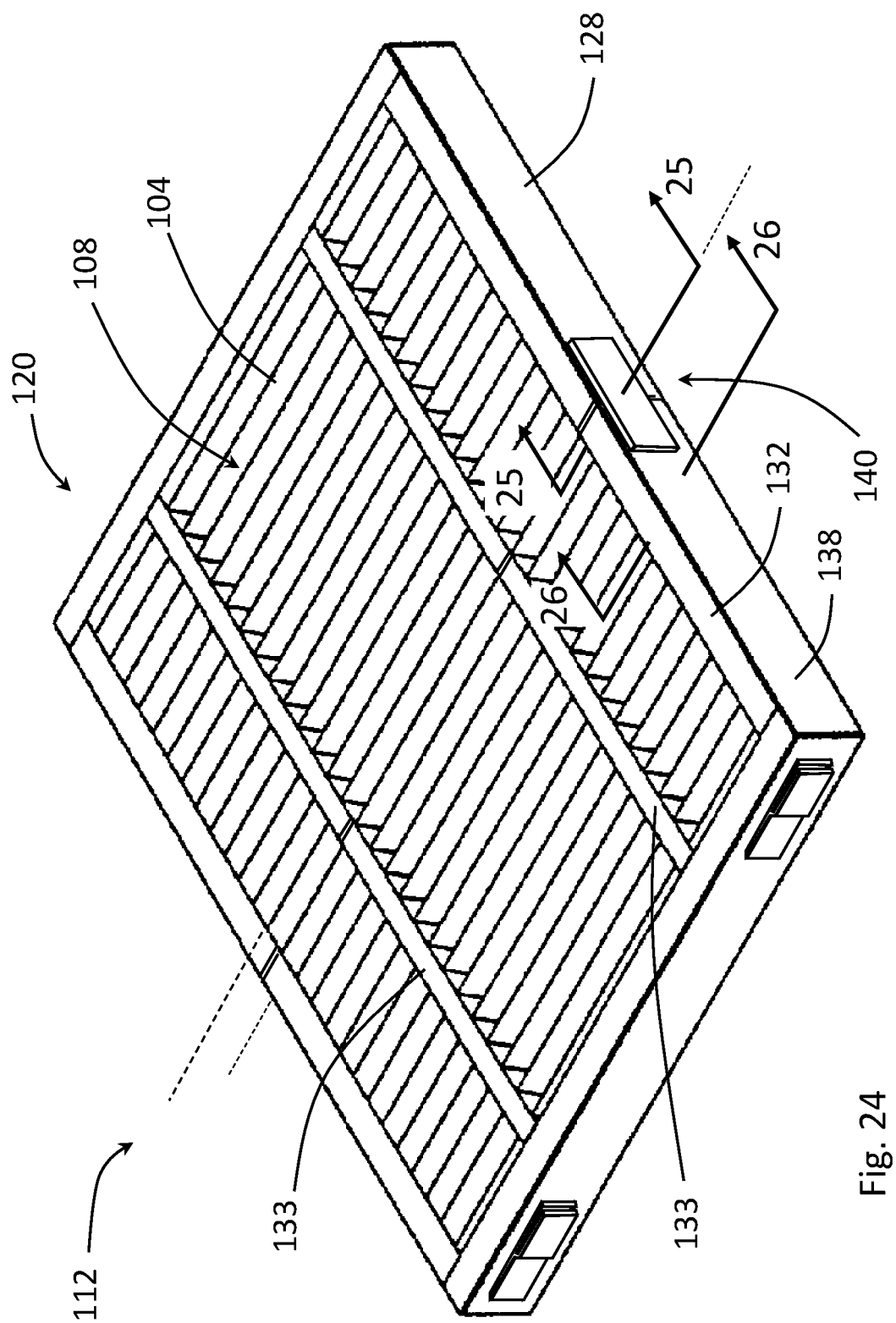
FIG. 24 shows a perspective bottom side view of the foldable pleated air filter of FIG. 22.

FIGS. 22 and 23 show top views of an air inlet face of foldable pleated air filter 112 of the invention. FIG. 24 is a bottom view of the foldable pleated air filter 112, flipped over to show an air outlet face. The foldable pleated air filter 112 includes a pleated filter media 104 and a rectangular support frame 120 surrounding the pleated filter media 104. The pleated filter media 104 has an upper, dirtied side 106 and a clean side 108. The support frame 120 includes four edge elements 122, 124, 126, 128. Each edge element is an elongated element having a base 138 and opposed attaching panels 132, 134 extending laterally from opposite lateral edges of the base 138. Two of the edge elements are opposed end elements 122,126, and the other two edge elements are opposed side elements 124,128. The material of the frame 120 is typically cardboard or paperboard, although other materials such as a thermoplastic can be used. The pleated filter media 104 is a three-dimensional structure that is formed of a filter layer that is pleated in a lateral direction. Edge portions or area 105 of the pleated filter media 104 are positioned and secured between the extending attaching panels 132, 134, respectively, as shown in FIGS. 22 and 24.

FIGS. 25 and 26 are section views taken through the side element 128 of FIG. 22. The foldable pleated air filter 112 includes a hinge joint 140 formed near the midpoint of each side elements, 124,128 that is configured as described hereinabove for hinge joint 50, including the hinge joint illustrated in FIG. 10 and other figures. Alternatively, the hinge joint 140 can configured as described hereinabove for hinge joint 40, including the joint hinge illustrated in FIG. 1 and other figures. As shown in FIG. 24, any elongated brace member 133 on the air outlet face are also cut to permit the filter 112 to fold.

Figure 27:
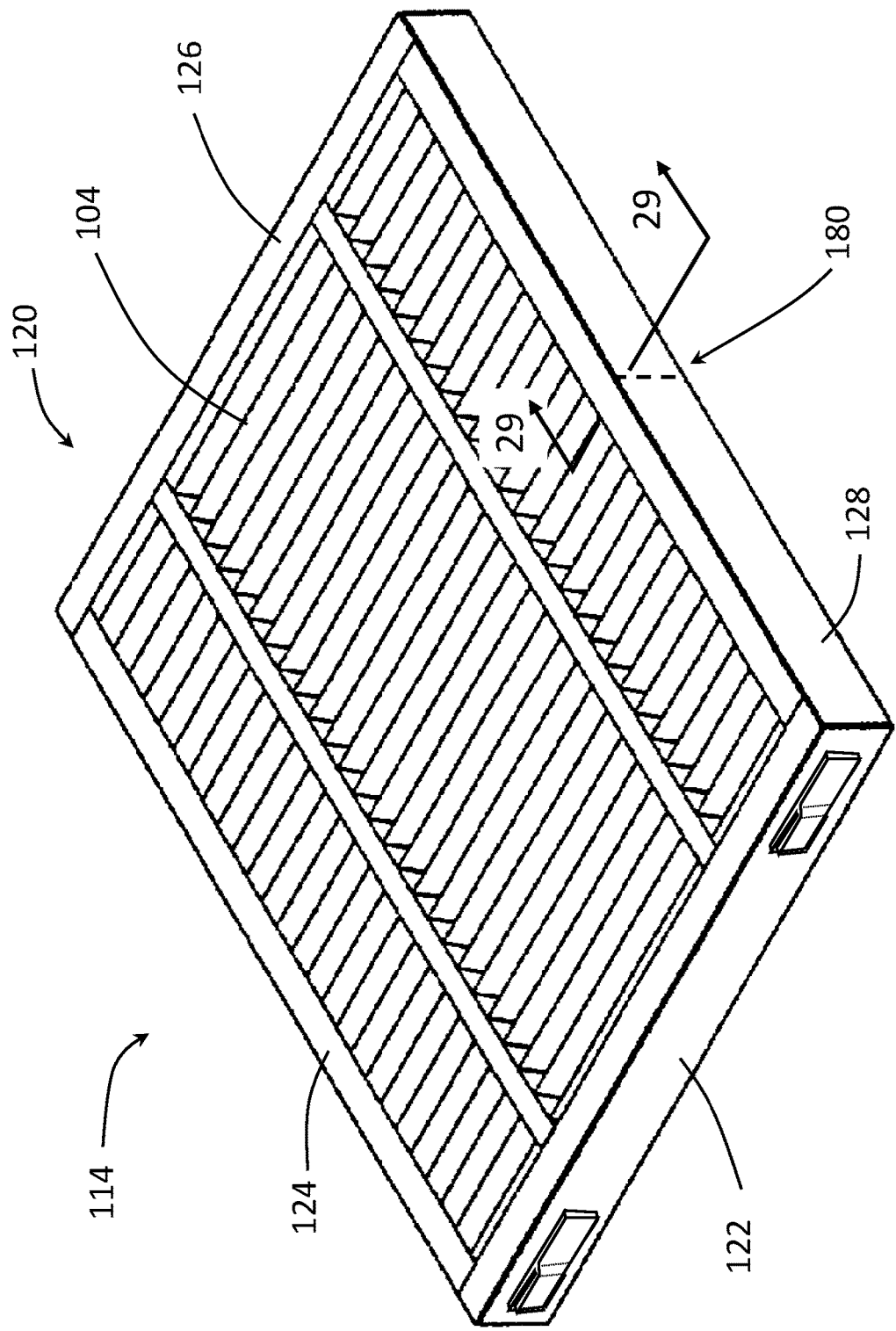
FIG. 27 shows a perspective top side view of another embodiment of a foldable pleated air filter with a frame and a pleated filter media, including the hinge locking means that includes the line of perforations.
Figure 28:
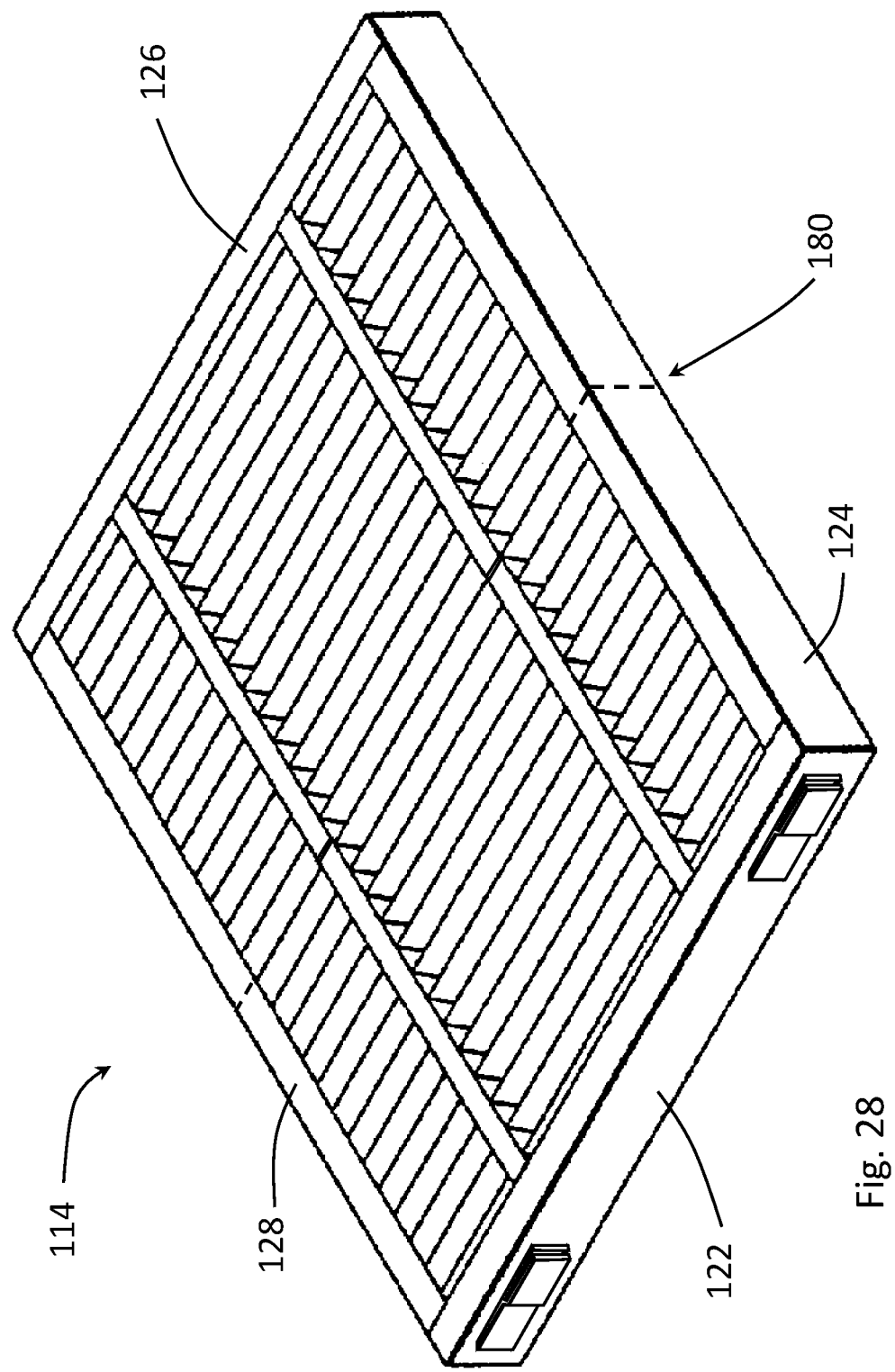
FIG. 28 shows a perspective bottom side view of the foldable pleated air filter of FIG. 27.
Figure 29:
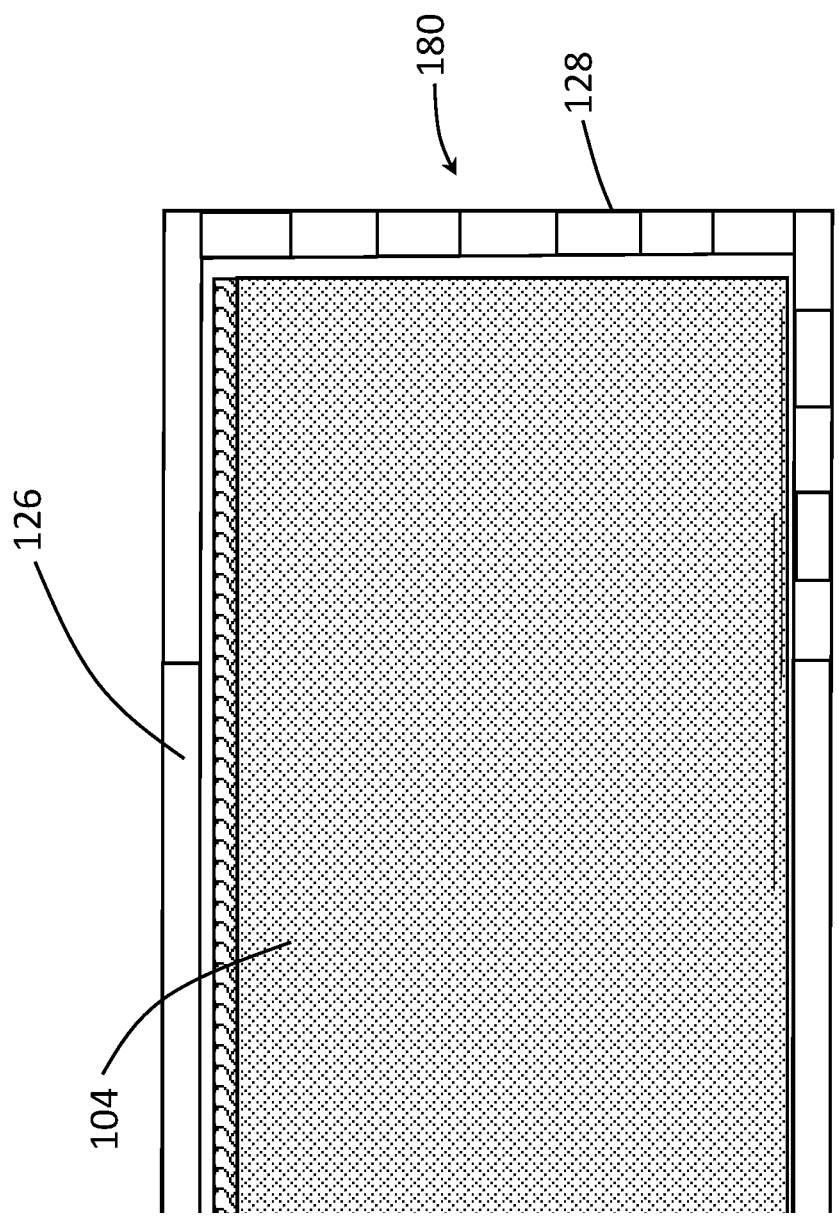
FIG. 29 shows a section view of the frame and the hinge locking means of FIG. 27 as seen through line 29-29.

FIG. 27 shows an air inlet face of another embodiment of a foldable pleated air filter 114 of the invention, the air inlet face also being the upper, dirtied side after usage. FIG. 28 shows the foldable pleated air filter 114 flipped over to show an air outlet face. FIG. 29 shows a section view of the frame and the hinge locking means of FIG. 27 as seen through line 29-29. The foldable pleated air filter 114 also includes a pleated filter media 104 and a rectangular support frame 120 surrounding the pleated filter media 104. The foldable pleated air filter 114 includes a perforated hinge joint 180 formed near the midpoint of each side elements 124,128 that is configured as described hereinabove for hinge joint 80, including the hinge joint illustrated in FIG. 20 and other figures.

In another invention shown in FIGS. 1 and 17, the filter frame 1 includes a filter media panel 4 and a rectangular support frame 20 surrounding the filter media panel 4, the rectangular support frame 20 including four edge members 22,24,26,28, and a handle 90 fixed to an outwardly-facing surface of at least one of the four edge members. In the illustrated embodiment, the handle 90 is affixed to the base panel 38 of the end edge member 22 at the end 23 of the frame 20 that will face out from the air duct. The handle 90 includes a grasping element shown as a tab 96 that is attached to and is configured to extend partially away from the outwardly-facing surface of a base portion 95 of the handle 90 that is secured to the base panel 38. The grasping element 96 can be grasped by the user to pull the filter frame 1 out from between the opposed slots in the air duct. In the illustrated embodiment, two handles are fixed at opposite ends of the base panel 38 of the end member 22, for grasping and pulling at both ends of the filter frame, although a single handle 90 can be placed, typically proximate the middle of the end member 22. The handles 90 can also be placed on the opposite end member 26, or on either or both of the side end members 24,28.

In an embodiment of the handle, an adhesive tape fabric or sheet can be folded in the middle to self-adhere and form the tab 96, and the end legs 95 can be adhesively attached to the base panel 38. The tab 96 can be folded over against the base panel 38 when in use in the air duct, as shown by handle 90 in FIG. 10, or can extend outwardly away for removal of the foldable air filter as shown by handle 92 in FIG. 17.

I claim:

1. A foldable air filter including a filter media panel and a rectangular support frame surrounding and secured to the filter media panel, the frame including opposed side frame elements having a hinge joint formed near the midpoint that allows the support frame and a dirt-capturing surface of the filter media panel to fold along lateral line from a planar, extended position to a folded position, the hinge joint having a fold line in a dirtied-side attaching panel of the side frame elements, and a cut formed through a base and a clean-side attaching panel of the side frame elements, and further including a hinge locking means for temporarily securing the hinge joint in the planar, extended position, for insertion into a furnace return air duct.

2. The foldable air filter according to claim 1, where the hinge locking means includes a no-stretch or low-stretch material that spans across the cut and is secured to at least one of the clean-side attaching panel or to the base panel, on both sides of the cut.

3. The foldable air filter according to claim 2, where the no-stretch or low-stretch member is selected from the group consisting of a thermoplastic or polymer film, a fabric layer, a paperboard layer, and a laminate thereof.

4. The foldable air filter according to claim 1, where the hinge locking means is secured to the support frame by a mechanical fixture or adhesive fixtures.

5. The foldable air filter according to claim 1, where the hinge locking means includes an adhesive tape member, and includes a tab that extends from the panel surface to allow a user's fingers to grasp and pull the adhesive tape member away from the panel.

6. The foldable air filter according to claim 1, where the hinge locking means include an adhesive tape member having frangible line or area across laterally that is configured to be split or broken across laterally so that the two opposed secured parts of the adhesive strap member can be separated.

7. The foldable air filter according to claim 1, where the hinge locking means is secured to the clean-side attaching panel on both sides of the cut.

8. The foldable air filter according to claim 1, where the hinge locking means is secured to the base panel on both sides of the cut.

9. The foldable air filter according to claim 1, where the filter media panel is a pleated filter media.

10. A foldable air filter including a filter media panel and a rectangular support frame surrounding and secured to the filter media panel, the frame including opposed side frame elements having a hinge joint formed near the midpoint that allows the support frame and a dirt-capturing surface of the filter media panel to fold along lateral line from a planar, extended position to a folded position, the hinge joint including a fold line in a dirtied-side attaching panel of the side frame elements, and a cut formed through a base and a clean-side attaching panel of the side frame elements, and a means for biasing the hinge joint to the planar, extended position.

11. The foldable air filter according to claim 10 where the biasing means is a strip of elastic member selected from a group consisting of an elastic film, an elastic fabric, or a laminate or combination thereof.

12. The foldable air filter according to claim 11 where the strip of elastic member is secured to the clean-side attaching panel by a securing fixture selected from a group consisting of a mechanical fixture and an adhesive fixture.

13. The foldable air filter according to claim 12 where the elastic strip is applied and secured to an inside surface of the clean-side attaching panel in a relaxed state, across the cut formed through the clean-side attaching panel.

14. The foldable air filter according to claim 10 where the frame elements are formed by folding a planar sheet of paperboard or cardboard.

15. The foldable air filter according to claim 10 where the frame further includes a means for holding the frame in the folded position, where the holding means is disposed in each of a corner of an end element and a side element, and is selected from a group consisting of a mechanical fastener and an adhesive fastener.

16. The foldable air filter according to claim 12 where the adhesive fastener is a pressure adhesive tape.

17. The foldable air filter according to claim 10, where the filter media panel is a pleated filter media.

18. A foldable air filter that includes: a filter media panel; a rectangular support frame surrounding the filter media panel, the rectangular support frame including a pair of opposed side elements, each side element including a base panel, a clean-side attaching panel, and a dirtied-side attaching panel of the side frame elements; and a perforated hinge joint disposed in each opposite side element, the perforated hinge joint including a line of perforations extending laterally through the base panel and the clean-side attaching panel, and a fold line extending laterally through the dirtied-side attaching panel.

19. The foldable air filter according to claim 18 wherein the line of perforations includes a plurality of bridging tabs between a plurality of perforation openings, the bridging tabs being sufficiently wide and numerous to hold together the two halves of each side frame element during normal use, including during insertion of the foldable air filter into an air duct, and are sufficiently few in number and narrow to permit a user to tear or break the bridging tabs and allow the foldable air filter to fold along the hinge joint.

20. The foldable air filter according to claim 18, where the filter media panel is a pleated filter media.

21. The foldable air filter according to claim 1, where the hinge locking means is disposed at a point proximate to the midpoint of the side frame elements.

* * * * *